United States Patent

Köhler et al.

Patent Number: 5,583,174
Date of Patent: Dec. 10, 1996

[54] MIXTURES OF SPECIFIC DIHYDROXYDIPHENYLCYCLOALKANE POLYCARBONATES AND MINERAL OIL

[75] Inventors: Burkhard Köhler; Peter Bier, both of Krefeld, Germany

[73] Assignee: Bayer AG, Leverkusen, Germany

[21] Appl. No.: 514,318

[22] Filed: Aug. 11, 1995

[30] Foreign Application Priority Data

Aug. 31, 1994 [DE] Germany ............... 44 30 947.3

[51] Int. Cl.[6] ............... C08L 69/00; C08K 5/01
[52] U.S. Cl. ............ 524/490; 524/491; 524/508; 524/611; 525/147; 525/148
[58] Field of Search ............... 525/147, 148; 524/490, 611, 508

[56] References Cited

U.S. PATENT DOCUMENTS

| | | | |
|---|---|---|---|
| 4,626,566 | 12/1986 | Miller | 525/490 |
| 5,104,723 | 4/1992 | Freitag | 525/462 |
| 5,126,428 | 6/1992 | Freitag et al. | 528/196 |

FOREIGN PATENT DOCUMENTS

| | | |
|---|---|---|
| 0359953 | 3/1990 | European Pat. Off. |
| 0395953 | 11/1990 | European Pat. Off. |
| 0519098 | 12/1992 | European Pat. Off. |
| 0528462 | 2/1993 | European Pat. Off. |
| 041093 | 10/1972 | Japan |
| 050258 | 5/1978 | Japan |
| 57-125253 | 8/1982 | Japan ... 525/148 |
| 58-201842 | 11/1983 | Japan ... 525/148 |

OTHER PUBLICATIONS

Orbit Abstract of EP 0 359 953 (Mar. 28, 1990).
Orbit Abstract of EP 0 395 953 (Nov. 7, 1990).

*Primary Examiner*—David Buttner
*Attorney, Agent, or Firm*—Connolly & Hutz

[57] ABSTRACT

Mixtures of

A) 75 to 99.5 wt. % of a high molecular weight, thermoplastic, aromatic polycarbonate with a molecular weight $M_w$ (weight average) of at least 10,000 which contains bifunctional carbonate structural units of the formula (I),

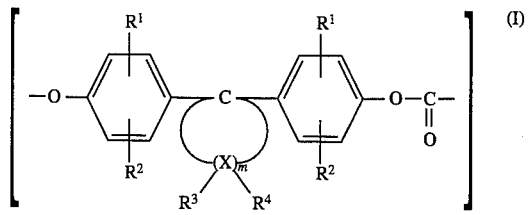

in which $R^1$ and $R^2$, independently of each other, represent hydrogen, halogen, preferably chlorine or bromine, or a $C_1$–$C_8$-alkyl, $C_5$–$C_6$-cycloalkyl, $C_6$–$C_{10}$-aryl, preferably phenyl, or $C_7$–$C_{12}$-aralkyl, preferably phenyl-$C_1$–$C_4$-alkyl, in particular a benzyl group, m is an integer from 4 to 7, preferably 4 or 5, $R^3$ and $R^4$ can be selected separately for each X and, independently of each other, represent hydrogen or a $C_1$–$C_6$-alkyl group and X represents carbon, with the proviso that $R^3$ and $R^4$ simultaneously represent an alkyl group on at least one X atom.

B) 0.5 to 15 wt. % of an aliphatic hydrocarbon with a molecular weight of 300 to 3,000 in particular mineral oil and C) 0 to 11 wt. % of a terpolymer of ethylene, acrylate and a monomer with epoxy groups, and the preparation of these mixtures.

13 Claims, No Drawings

MIXTURES OF SPECIFIC DIHYDROXYDIPHENYLCYCLOALKANE POLYCARBONATES AND MINERAL OIL

The invention relates to mixtures of specific dihydroxydiphenylcycloalkane polycarbonates, aliphatic hydrocarbons and optionally terpolymers of ethylene, acrylates and monomers with epoxy groups.

Suitable dihydroxydiphenylcycloalkane polycarbonates in accordance with the invention are known and are described in European Patent 395 953. The polycarbonate based on 1,1-bis-(4-hydroxyphenyl)-3,3,5-trimethylcyclohexane and the copolycarbonate of this bisphenol and bisphenol A are preferred.

These polycarbonates are characterised by a high heat resistance but their flow properties, resistance to stress cracking and toughness can, however, still be improved.

The invention is based on the findings that the polycarbonates mentioned can be mixed with aliphatic hydrocarbons such as mineral oil or paraffin oil, that the mixtures demonstrate improved flow properties with only a small decrease in heat resistance and that the impact resistance can be raised still further by the additional admixture of terpolymers with epoxy groups.

The invention provides mixtures of A) 75 to 99.5 wt %, preferably 89 to 97 wt. % of a high molecular weight, thermoplastic, aromatic polycarbonate with a molecular weight $M_w$ (weight average) of at least 10,000, preferably 20,000 to 300,000, which contains bifunctional carbonate structural units of the formula (I),

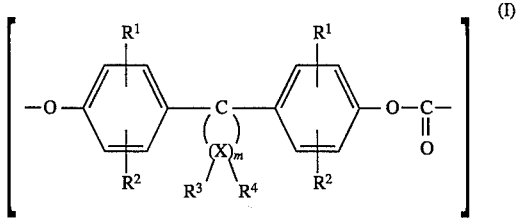

in which
R$^1$ and R$^2$, independently of each other, represent hydrogen, halogen, preferably chlorine or bromine, or a C$_1$–C$_8$-alkyl, C$_5$–C$_6$-cycloalkyl, C$_6$–C$_{10}$-aryl, preferably phenyl, or C$_7$–C$_{12}$-aralkyl, preferably phenyl-C$_1$–C$_4$-alkyl, in particular a benzyl group, m is an integer from 4 to 7, preferably 4 or 5, R$^3$ and R$^4$ can be selected separately for each X and, independently of each other, represent hydrogen or a C$_1$–C$_6$-alkyl group and X represents carbon,
with the proviso that R$^3$ and R$^4$ simultaneously represent an alkyl group on at least one X atom.

B) 0.5 to 15 wt. %, preferably 3 to 11 wt. % of an aliphatic hydrocarbon with a molecular weight of 300 to 3,000, preferably 400 to 1,500 g/mol (determined by ebullioscopy), in particular mineral oil or paraffin oil and C) 0 to 11 wt. % of a terpolymer of ethylene, acrylate and a monomer with epoxy groups.

Polycarbonates A) and their preparation are the object of European Patent 359 953. The polycarbonates themselves and their preparation are described in detail there.

Accordingly, starting compounds for the preparation of polycarbonates A) are dihydroxydiphenylcycloalkanes of the formula (Ia)

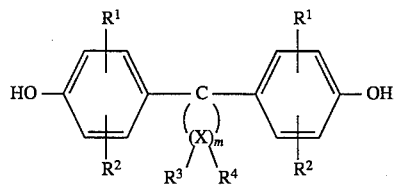

in which
X, R$^1$, R$^2$, R$^3$, R$^4$ and m are defined in the same way as for formula (I).

R$^3$ and R$^4$ are preferably both alkyl groups on 1 to 2 X atoms, in particular on only one X atom.

The preferred alkyl group is methyl; the X atoms in the α position to the diphenyl-substituted carbon atom (C-1) are preferably not dialkyl-substituted, alkyl substitution in the β position to C-1, however, is preferred.

Dihydroxydiphenylcycloalkanes with 5 and 6 carbon atoms in the cycloaliphatic ring (m=4 or 5, formula Ia), for example diphenols of the formulae (Ib) to (Id), are preferred,

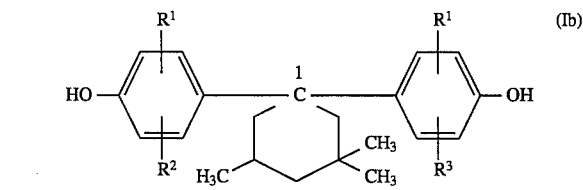

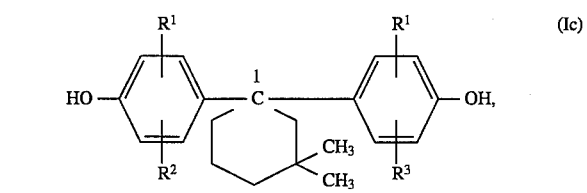

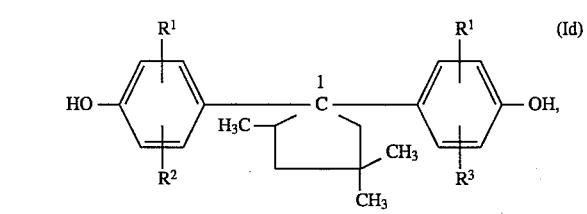

wherein 1,1-bis-(4-hydroxyphenyl)-3,3,5-trimethylcyclohexane (formula Ib with R$^1$ and R$^2$ both representing hydrogen) is particularly preferred.

Either one diphenol of the formula (Ia) may be used, to form homopolycarbonates, or several diphenols of the formula (Ia) may be used, to form copolycarbonates.

In addition, diphenols of the formula (Ia) may also be used mixed with other diphenols, for example those of the formula (Ie)

to prepare high molecular weight, thermoplastic, aromatic polycarbonates.

Suitable other diphenols of the formula (Ie) are those in which Z is an aromatic group with 6 to 30 carbon atoms, which may contain one or more aromatic nuclei, may be substituted and may contain aliphatic groups or different cycloaliphatic groups from those in formula (Ia) or heteroatoms as bridging members.

Preferred other diphenols are, for example:
4,4'-dihydroxydiphenyl, 2,2-bis-(4-hydroxyphenyl)propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)- propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl--4hydroxyphenyl)-p-diisopropylbenzene, 2,2-bis-3,5-dichloro-4-hydroxyphenyl)-propane and 2,2-bis-(3,5-dibromo-4-hydroxyphenyl)-propane.

Particularly preferred diphenols of the formula (Ie) are, for example:
2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

2,2-bis-(4-hydroxyphenyl)-cyclohexane is particularly preferred. The other diphenols may be used either on their own or in a mixture.

The molar ratio of diphenols of the formula (Ia) to optionally jointly used other diphenols of the formula (Ie) extends from 100 mol-% of (Ia) to 0 mol-% of (Ie) to 2 mol-% of (Ia) to 98 mol-% of (Ie), preferably from 100 mol-% of (Ia) to 0% of (Ie) to 5 mol-% of (Ia) to 95 mol-% of (Ie) and in particular from 100 mol-% of (Ia) to 0 mol-% of (Ie) to 10 mol-% of (Ia) to 90 mol-% of (Ie) and quite specifically from 100 mol-% of (Ia) to 0 mol-% of (Ie) to 20 mol-% of (Ia) to 80 mol-% of (Ie).

High molecular weight polycarbonates from diphenols of the formula (Ia), optionally combined with other diphenols, may be prepared using all the known methods for preparing polycarbonates. In this case, the various diphenols may be linked together either randomly or in blocks.

The polycarbonates may be branched in a way known per se. If branching is required, it can be achieved in a known way by incorporating small amounts, preferably amounts between 0.05 and 2.0 mol-% (with respect to the diphenols used) of trifunctional or more than trifunctional compounds, in particular those with three or more phenolic hydroxyl groups into the polymer. Some branching agents with three or more than three phenolic hydroxyl groups are:
phloroglucine, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5-methyl-benzyl)4-methylphenol, 2-(4-hydroxyphenyl)-2-(2,4-dihydroxyphenyl)-propane, hexa-[4-(4-hydroxyphenyl-isopropyl)-phenyl]-orthoterephthalates, tetra-(4-hydroxyphenyl)-methane, tetra-[4-(4-dihydroxyphenyl-isopropyl)-phenoxy]-methane and 1,4-bis-[4',4"-dihydroxytriphenyl)-methyl]-benzene.

Some other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Chain stoppers for controlling the molecular weight of polycarbonates A in a way known per se are monofunctional compounds in conventional concentrates. Suitable compounds are e.g. phenol, tert.butylphenols or other alkyl-$C_1$–$C_7$-substituted phenols. Small amounts of phenols of the formula (If) are particularly preferred for controlling the molecular weight,

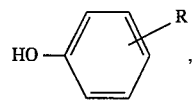

in which
R represents a branched $C_8$ and/or $C_9$-alkyl group.

The proportion of $CH_3$ protons in the alkyl group is preferably between 47 and 89% and the proportion of CH and $CH_2$ protons is preferably between 53 and 11%. Also, R is preferably in the o and/or p-position to the OH group and particularly preferably the upper limit of the ortho-fraction is 20%. Chain stoppers are generally used in amounts of 0.5 to 10, preferably 1.5 to 8 mol-%, with respect to the diphenols used.

Polycarbonates A may preferably be prepared by the phase boundary method in a manner known per se (see H. Schnell "Chemistry and Physics of Polycarbonates", Polymer Reviews, vol. IX, pages 33 et seq., Interscience Publ. 1964).

In this case, diphenols of the formula (Ia) are dissolved in an aqueous alkaline phase. To prepare copolycarbonates with other diphenols, mixtures of diphenols of the formula (Ia) and the other diphenols, for example those of the formula (Ie), are used. To control the molecular weight, chain stoppers, e.g. those of the formula (If), may be added. The mixture is then reacted with phosgene in the presence of an inert, preferably polycarbonate-dissolving, organic phase, using the method of phase boundary condensation. The reaction temperature is between 0° C. and 40° C.

The optionally used branching agent (preferably 0.05 to 2.0 mol-%) may either be initially placed, with the diphenols, in the aqueous alkaline phase or added before phosgenation, dissolved in the organic solvent. In addition to diphenols of the formula (Ia) and optionally other diphenols (Ie), their mono and/or bis-chloroformates may also be used, wherein these are added dissolved in organic solvents. The amounts of chain stoppers and of branching agents depend on the molar amounts of diphenolate groups corresponding to formula (Ia) and optionally formula (Ie). When also using chloroformates the amount of phosgene may be correspondingly reduced in a known way.

Solvents which are suitable for the chain stoppers and optionally for the branching agents and chloroformates are, for example, methylene chloride, chlorobenzene, acetone, acetonitrile and mixtures of these solvents, in particular mixtures of methylene chloride and chlorobenzene. The chain stoppers and branching agents which are also used may optionally be dissolved in the same solvent.

The organic phase used for phase boundary polycondensation may be, for example, methylene chloride, chlorobenzene or mixtures of methylene chloride and chlorobenzene.

The aqueous alkaline phase may be, for example, NaOH solution. Production of polycarbonates A by the phase boundary method may be catalysed in a conventional way by catalysts such as tertiary amines, in particular tertiary aliphatic amines such as tributylamine or triethylamine. The catalysts may be used in amounts of 0.05 to 10 mol-%, with respect to moles of diphenols used. The catalysts may be added before the start of phosgenation or during or after phosgenation.

Polycarbonates A may be prepared by a known process in a homogeneous phase, the so-called "pyridine process" and also by the known melt transesterification method using, for example, diphenyl carbonate instead of phosgene.

Polycarbonates A preferably have a molecular weight $M_w$ (weight average, determined by gel chromatography after previous calibration) of at least 10,000, particularly preferably 20,000 to 300,000 and in particular 20,000 to 80,000.

Particularly preferred polycarbonates A are thus those consisting of units with the formula (Ig)

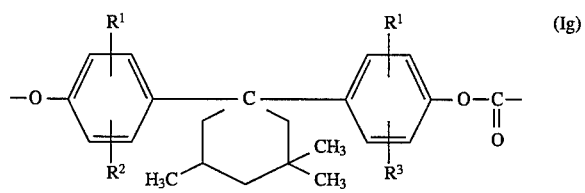

in which $R^1$ and $R^2$ are defined in the same way as for formula (I), but particularly preferably represent hydrogen.

In addition, the polycarbonate properties may be varied in a convenient manner by making up any composition with other diphenols, in particular with those of the formula (Ie). In this type of copolycarbonate, diphenols of the formula (Ia) are contained in the polycarbonates in amounts of 100 mol-% to 2 mol-%, preferably in amounts of 100 mol-% to 5 mol-% and in particular in amounts of 100 mol-% to 10 mol-% and quite specifically of 100 mol-% to 20 mol-%, with respect to the total amount of 100 mol-% of diphenol units.

Mixtures may be prepared by melt mixing the components in internal mixers or extruders at 220° C. to 380° C. or by mutual dissolution of the components in suitable solvents, such as e.g. chlorobenzene and/or methylene chloride, and evaporating on an evaporation extruder.

Aliphatic hydrocarbons B are branched or unbranched mixtures of essentially aliphatic or cycloaliphatic hydrocarbons, which are preferably liquid and have a boiling point higher than 360° C. These include mineral oils (see R ömpps Chemie Lexikon, vol. 4, 8th ed., Franckh'sche Verlagshandlung, Stuttgart, page 2622) and paraffin oils (see R ömpps Chemie Lexikon, vol. 4, 8th ed., Franckk'sche Verlagshandlung, Stuttgart, page 2991, keyword "paraffin").

Mineral oils, a specific type of hydrocarbon B, are obtained by hydrogenation or sulphuric acid treatment of petroleum fractions which boil at temperatures above 250° C., preferably above 350° C. Hydrocarbons B are also obtainable synthetically by oligomerisation of olefins, preferably ethene, propene, butene-1 or isobutene.

Copolymers C are those made from 55 to 95 wt. % of ethylene, 4 to 44 wt. % of acrylates and 1 to 15 wt. % of epoxy-functional monomers, preferably glycidyl methacrylate or glycidyl acrylate.

Terpolymers made from ethylene, butyl or 2-ethylhexyl acrylate and glycidyl methacrylate are particularly preferred.

Mixtures according to the invention can be processed by injection moulding or extrusion to give moulded items or semi-finished products. The moulded items may be used, for instance, as reflectors for lamps or housings for industrial equipment and in the motor vehicle construction industry (applications under the bonnet, close to the engine).

The mixtures are characterised by good flow properties, high heat resistance and, especially when adding a terpolymer, by a high degree of toughness and resistance to stress cracking.

EXAMPLES

Example 1

1900 g of a copolycarbonate made from 65 mol-% of bisphenol A and 35 mol-% of 1,1-bishydroxyphenyl-3,3,5-trimethylcyclohexane with a relative solution viscosity of 1.29 (0.5 % at 25° C. in methylene chloride) and 100 g of mineral oil (mineral oil, white, heavy from the Aldrich Co.) are dissolved in 3 l of chlorobenzene and 8 l of methylene chloride and evaporated in an evaporation extruder (ZSK 32 with a vacuum stillhead) at 320° C. A mixture with the following melt viscosities (measured at 320° C.) was obtained:

947 Pas at 100 $s^{-1}$; 474 Pas at 1000 $s^{-1}$; 377 Pas at 1500 $s^{-1}$.

The corresponding values for the copolycarbonate without mineral oil, for comparison, are: 1359 Pas; 594 Pas; 458 Pas.

Example 2

1800 g of copolycarbonate are mixed with 100 g of a terpolymer of ethylene, butyl acrylate and glycidyl methacrylate (Lotader AX 8660® from the CdF Co.) and 100 g of mineral oil. A mixture with a notched impact strength of 39 kJ/m² (100% ductile fractures) is obtained. A bar stressed to 0.8% outer fibre strain does not break after being treated for 2 minutes with a mixture of toluene/isooctane 1:1 (the copolycarbonate breaks even without being pre-stressed).

Comparison Example 1

1900 g of copolycarbonate is mixed with 100 g of terpolymer. A mixture which demonstrates brittle fractures in 20% of cases in the notched impact test is obtained.

What is claimed is:
1. Mixtures of
   A) 75 to 99.5 wt. % of a high molecular weight, thermoplastic, aromatic polycarbonate with a molecular weight $M_w$ (weight average) of at least 10,000 which contains bifunctional carbonate structural units of the formula (I),

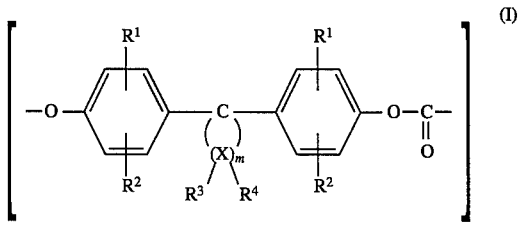

in which
   $R^1$ and $R^2$, independently of each other, represent hydrogen, halogen, or a $C_1$–$C_8$-alkyl,
   $C_5$–$C_6$-cycloalkyl, $C_6$–$C_{10}$-aryl, or $C_7$–$C_{12}$-aralkyl,
   m is an integer from 4 to 7,
   $R^3$ and $R^4$ are selected separately for each X and, independently of each other, represent hydrogen or a $C_1$–$C_6$-alkyl group and
   X represents carbon,
with the proviso that $R^3$ and $R^4$ simultaneously represent an alkyl group on at least one X atom,
   B) 0.5 to 15 wt. % of an aliphatic hydrocarbon with a molecular weight of 300 to 3,000 (determined by ebullioscopy), wherein said aliphatic hydrocarbon is mineral oil, and
   C) 5 to 11 wt. % of a terpolymer of ethylene, acrylate and a monomer with epoxy groups.
2. Mixtures according to claim 1, wherein component C) is a terpolymer of ethylene, butyl acrylate and glycidyl methacrylate.

3. Mixtures according to claim 1, wherein component A) is present in an amount of 89 to 97 wt. %.

4. Mixtures according to claim 1, wherein the molecular weight $M_w$ (weight average) of the thermoplastic, aromatic polycarbonate is from 20,000 to 300,000.

5. Mixtures according to claim 1, wherein $R^1$ and $R^2$, independently of each other, are selected from the group consisting of chlorine and bromine.

6. Mixtures according to claim 1, wherein $R^1$ and $R^2$, independently of each other, are selected from the group consisting of a phenyl group, a phenyl-$C_1$–$C_4$-alkyl group and a benzyl group.

7. Mixtures according to claim 1, wherein m is 4 or 5.

8. Mixtures according to claim 1, wherein component B) is present in an amount of 3 to 11 wt. %.

9. Mixtures according to claim 1, wherein the molecular weight of the aliphatic hydrocarbon in B) is from 400 to 1,500 g/mol (determined by ebullioscopy).

10. Mixtures according to claim 1, wherein component C) is a terpolymer of 55 to 95 wt. % of ethylene, 4 to 44 wt. % of acrylates and 1 to 15 wt. % of epoxy-functional monomers.

11. Mixtures according to claim 1, wherein component C) is a terpolymer of ethylene, butyl or 2-ethylhexyl acrylate and glycidyl methacrylate.

12. Mixtures according to claim 1, wherein component
B) is a mineral oil formed by hydrogenation or sulphuric acid treatment of petroleum fractions which boil at temperatures above 250° C.

13. Mixtures according to claim 1, wherein component
B) is a mineral oil formed by hydrogenation or sulphuric acid treatment of petroleum fractions which boil at temperatures above 350° C.

\* \* \* \* \*